(12) United States Patent
Anderson et al.

(10) Patent No.: US 10,107,419 B2
(45) Date of Patent: Oct. 23, 2018

(54) PIPE CLIPS AND BRACKETS THEREFOR

(71) Applicant: ABEY AUSTRALIA PTY. LTD., Melton (AU)

(72) Inventors: Geoffrey Anderson, Melton (AU); Mathew Peart, Melton (AU)

(73) Assignee: Abey Australia Pty. Ltd., Melton, Victoria (AU)

( * ) Notice: Subject to any disclaimer, the term of this patent is extended or adjusted under 35 U.S.C. 154(b) by 0 days.

(21) Appl. No.: 15/315,249

(22) PCT Filed: Mar. 31, 2015

(86) PCT No.: PCT/AU2015/050145
§ 371 (c)(1),
(2) Date: Nov. 30, 2016

(87) PCT Pub. No.: WO2015/149128
PCT Pub. Date: Oct. 8, 2015

(65) Prior Publication Data
US 2017/0219128 A1    Aug. 3, 2017

(30) Foreign Application Priority Data
Mar. 31, 2014 (AU) .............................. 2014901161

(51) Int. Cl.
*F16L 3/137* (2006.01)
*F16L 3/123* (2006.01)
(Continued)

(52) U.S. Cl.
CPC ................ *F16L 3/137* (2013.01); *F16B 2/08* (2013.01); *F16L 3/1058* (2013.01);
(Continued)

(58) Field of Classification Search
CPC . F16L 3/14; F16L 3/137; F16L 3/1058; F16B 2/08
(Continued)

(56) References Cited

U.S. PATENT DOCUMENTS 2,931,605 A * 4/1960 Kelly ...................... F16L 3/133
248/59
3,802,654 A * 4/1974 Jenko ...................... H02G 3/065
174/72 A
(Continued)

FOREIGN PATENT DOCUMENTS

| EP | 1460323 B1 | 7/2007 |
| EP | 1700967 B1 | 8/2009 |
| WO | 2013/185182 A1 | 12/2013 |

OTHER PUBLICATIONS

International Preliminary Report on Patentability issued in corresponding Application No. PCT/AU2015/050145 dated Oct. 4, 2016, 7 pages.

*Primary Examiner* — Eret C McNichols
(74) *Attorney, Agent, or Firm* — Polsinelli PC (57) ABSTRACT

A bracket of a unitary construction and being of a substantial U-shape having a first elongate section and opposed extension sections extending from opposed free ends of said elongate section, and at an angle to the plane of said elongate section, the arrangement including a slot which extends across at least part of said elongate section and at least part of one of said extension sections.

2 Claims, 11 Drawing Sheets (51) Int. Cl.
*F16L 3/13* (2006.01)
*F16L 3/14* (2006.01)
*F16L 3/10* (2006.01)
*F16B 2/08* (2006.01)

(52) U.S. Cl.
CPC .............. *F16L 3/1233* (2013.01); *F16L 3/13* (2013.01); *F16L 3/14* (2013.01)

(58) Field of Classification Search
USPC .................................................. 248/74.5, 74.3
See application file for complete search history.

(56) References Cited

U.S. PATENT DOCUMENTS

| | | | | |
|---|---|---|---|---|
| 4,209,155 A | | 6/1980 | Florian | |
| 4,460,147 A | * | 7/1984 | Macbain | F16B 12/22 248/222.41 |
| 4,971,272 A | * | 11/1990 | Gudridge | F16L 3/137 24/17 AP |
| 5,417,401 A | * | 5/1995 | Thompson | F24F 1/027 248/300 |
| 5,511,288 A | * | 4/1996 | McAndrews | F16L 3/137 24/16 R |
| 5,704,574 A | * | 1/1998 | Kasubke | F16L 3/12 248/316.1 |
| 5,730,522 A | * | 3/1998 | Wyke | F21V 19/00 248/200 |
| 6,669,156 B2 | * | 12/2003 | East | E05D 15/24 16/94 R |
| 7,021,599 B2 | * | 4/2006 | DeGrazia | H01H 71/70 248/645 |
| 7,195,218 B2 | * | 3/2007 | James | A47B 61/003 248/251 |
| 7,229,051 B2 | * | 6/2007 | Mailhot, Jr. | A61M 5/1418 211/70.6 |
| 7,770,849 B2 | * | 8/2010 | Martin | H02G 3/32 24/115 L |
| 8,864,086 B2 | * | 10/2014 | Sutherland | H02G 3/32 248/74.3 |
| 8,870,135 B2 | * | 10/2014 | Grubbs | F16L 3/24 248/200 |
| 9,062,800 B2 | * | 6/2015 | Sampson | F16L 3/137 |
| 9,562,628 B2 | * | 2/2017 | Nuernberger | H02G 3/32 |
| 9,810,369 B2 | * | 11/2017 | Lilieholm | H01Q 1/1207 |
| 2017/0045070 A1 | * | 2/2017 | Muntasser | F16B 2/08 |
| 2017/0122460 A1 | * | 5/2017 | Joshi | H02G 3/32 |
| 2017/0219129 A1 | * | 8/2017 | Howe | F16B 1/00 |
| 2017/0317480 A1 | * | 11/2017 | Rouleau | H02G 3/0456 |

* cited by examiner

PIPE CLIPS AND BRACKETS THEREFOR

FIELD OF THE INVENTION

The present invention relates, in general terms, to an improved means for receiving, releasably retaining and supporting ducting, piping, tubing or the like relative to a given surface. The present invention, more particularly but not exclusively, relates to improvements in brackets of the type described and defined in the present applicant's Australian Patent Applications No. 2013273932.

Throughout the ensuing specification reference will be made to especially preferred embodiments of the invention, intended to assist in the disposition and retention of a water pipe or the like, made of metal, plastics material or otherwise, in a substantially fixed position relative to a given surface, whether such surface be a wall, a ceiling, a roof or any other surface of a building or the like structure. It should be understood, however, that the invention is not under any circumstances to be considered to be limited to any preferred embodiment or embodiments, or particular context of usage, described in detail hereinafter. The bracket in accordance with the invention lends itself readily to usage in a variety of different contexts, indeed in any context wherein any form of piping, ducting, tubing or the like—for carrying a liquid or a fluid—is to be suspended from or in juxtaposition to a surface of, or disposed within a given area of, a building or the like structure.

BACKGROUND OF THE INVENTION

What will hereinafter be referred as pipe clips, whether constructed wholly or principally of metal or of plastics material, have been in use for a significant period of time for purposes of attaching and/or locating piping, tubing, ducting or the like at, to or in the vicinity of walls, ceilings or other surfaces of a building or the like structure. In one known arrangement such a pipe clip includes opposed clip body halves which are adapted to be joined together to surround the piping, tubing, ducting or the like. Another known arrangement includes a pipe clip in which the clip body is formed of a single part which is, in use, adapted to be bent in order to be located around piping, tubing, ducting or the like and then bent again in order to surround such. With clips of this general type a fastening means is utilised for purposes of joining together either the opposed clip body halves or the free ends of the one-piece type clip, such fastening members being in the form of a threaded rod or threaded bolt, with a nut or the like associated therewith.

The accepted or general practice when installing, for example, a pipe, duct or the like in place relative to a given surface, whether that surface be vertical, horizontal or anywhere in-between, is as follows:

(i) firstly a number of brackets are disposed/installed on the surface, at spaced-apart locations therealong, using any known means, as for example screws, bolts or the like;
(ii) then each bracket has releasably associated therewith a clip member of the aforementioned type;
(iii) thereafter a length of pipe, duct, tubing or the like is located within the confines of the clips, relative to the bracket in each instance; and
(iv) the free ends of each clip member are brought together such that each clip member surrounds the pipe, duct or the like at each location, and then locked together.

Arrangements such as those as referred to in the preceding paragraph, despite being in common use, have been found to suffer from the drawback/disadvantage of being somewhat difficult to actually install and/or remove or replace relative to a wall, roof, ceiling or the like of a building or the like structure. In one particular known arrangement the practice is for a bracket or the like member to be first installed at the appropriate or desired position or positions along or adjacent to the wall, roof, ceiling or the like surface, such bracket being intended to co-operate with a clip member and to allow for the piping, tubing or ducting to be disposed at a preferred and/or predetermined spacing from the given surface. With such an arrangement, once the bracket is in place it then becomes necessary for the installer to hold the relevant piping, tubing or ducting in place and to attempt to locate the clip member therearound, and thereafter affix the clip member in place relative to the bracket per medium of a screw or bolt and associated nut or the like member. When one considers that in some circumstances the installer (as for example a plumber or the like tradesman or even the home owner) will be operating within an enclosed/confined space, there can be an unacceptable degree of difficulty associated with installation of pipe clips of the aforementioned type. Sometimes a tool, as for example a screw driver or the like, may be required in order to allow for correct installation of the nut and associated screw or bolt. When one person is working alone, the degree of difficulty increases even further. Again, when working in confined spaces the need to use a tool increases the degree of difficulty of installation. This is especially the case for pipes of a larger diameter, which will require a more rigid clip for affixing in place.

When a rigid or substantially rigid clip member is being used or is to be used, it has been found that the degree of difficulty in installing or removing such a clip member increases, due to the very rigidity of the clip member itself. To be more specific, it has been found to be difficult for a single person to manually apply the pressure/load needed to bring the opposed free ends of the one-piece type clip member close enough together to allow for either installation of the aforementioned fastening members or, in the alternative, loosening thereof. Indeed experience has revealed that, especially for larger-sized and more rigid clip members, it's generally necessary for the installer to use a suitable tool, as for example, pliers or pincers, to allow for the two free ends to be brought into juxtaposition.

It has also been found that, with known brackets of this general type, there is a tendency for a clip member to separate or release therefrom during the procedure of locating or "stringing" a length of piping, tubing or ducting. As well as being a source of annoyance to the installer, such can give rise to an increase in the length of time needed to locate or "string" a length of piping, tubing or ducting.

The present invention seeks to overcome the problems and disadvantages associated with the prior art by providing a means for assisting in location of piping, ducting, tubing or the like relative to a given surface which does not rely on the use of a threaded means, such as a screw and associated bolt or the like. The arrangements in accordance with the present invention can be readily and speedily utilised by a single person, without the need for ancillary tooling.

In accordance with one aspect of the invention there is provided a bracket which is adapted, in use, to be releasably co-operable with a pipe clip of the aforementioned type, said bracket being of a unitary construction and including: a first centrally disposed elongate member having opposed apertures therein; and an extension member extending from opposed ends of said elongate member and at an angle to the plane of said elongate member, each said extension member including a longitudinal slot extending along at least part of the length dimension thereof, and wherein each extension member includes a plurality of lines of weakening, at spaced apart locations along the length dimension thereof and extending at least partially along the width or lateral dimension thereof.

In accordance with another aspect of the invention there is provided a bracket adapted, in use, to be releasably co-operable with a pipe clip said bracket being of a unitary construction and including a substantially U-shaped member/section; and opposed extension members/sections extending from opposed free ends of said U-shaped member/section, and at an angle to the plane of said U-shaped member/section, wherein each extension member/section includes a slot which extends across at least part of the width dimension thereof.

In accordance with a further aspect of the invention there is provided a bracket of a unitary construction which is adapted, in use, to be releasably co-operate with a pipe clip and including a first elongate and substantially plane section, having a free end; a second, intermediate section extending from said other end of said first section and at an angle thereto; and a third, end section extending from said second section and at an angle thereto, and wherein both said first and second sections have a shaped slot extending over at least part of the length dimension thereof.

DESCRIPTION OF THE DRAWINGS

In order that the invention may be more clearly understood and put into practical effect reference will now be made to preferred embodiments of an adjustable support means in accordance with the present invention. The ensuing description is given by way of non-limitative example only and is with reference to the accompanying drawings, wherein.

DESCRIPTION OF PREFERRED EMBODIMENTS

Figure 1:
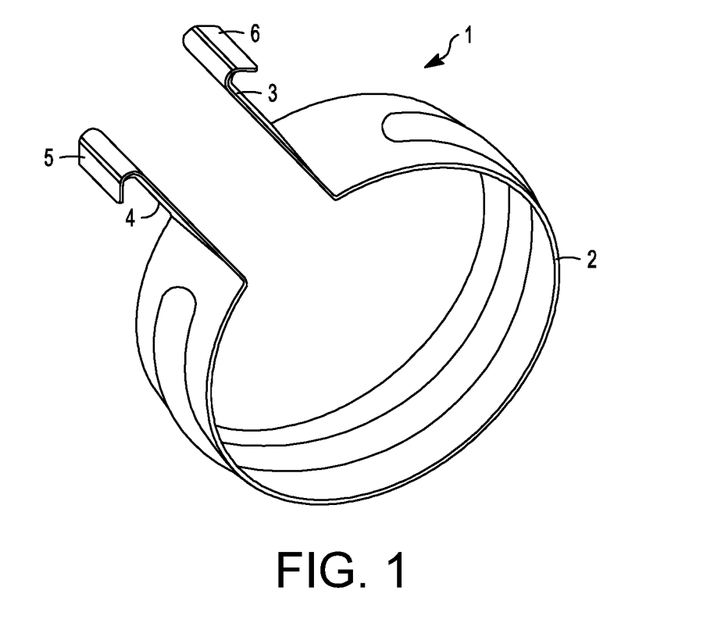
FIG. 1 is a perspective view of a first embodiment of a clip member for supporting piping, tubing or ducting, for use with a bracket in accordance with the invention.
Figure 2:
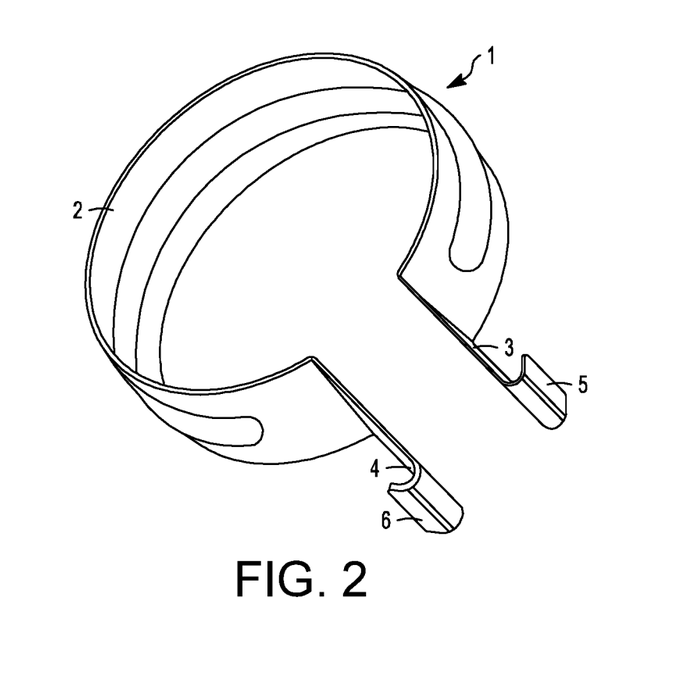
FIG. 2 is a further perspective view of the clip member of FIG. 1.
Figure 3:
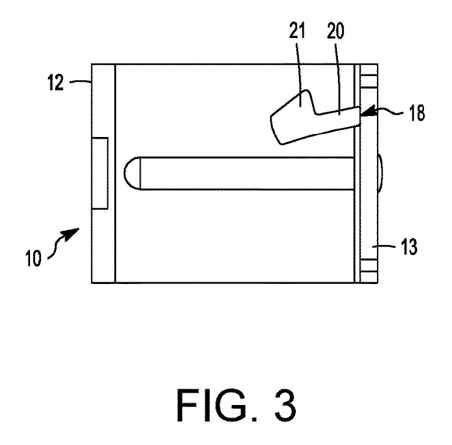
FIG. 3 is a top view of a first embodiment of a bracket in accordance with the invention.
Figure 4:
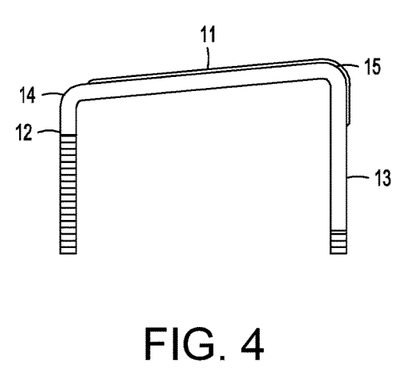
FIG. 4 is a side view of the bracket of FIG. 3.
Figure 5:
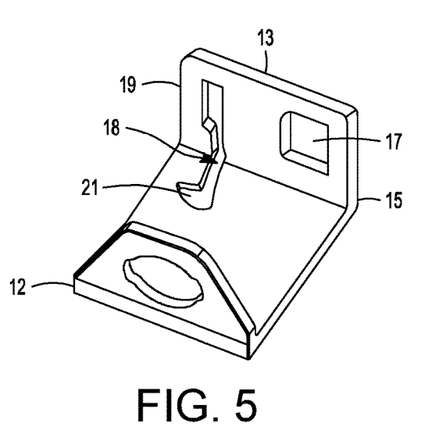
FIG. 5 is a top perspective view of the bracket of FIGS. 3 and 4.
Figure 6:
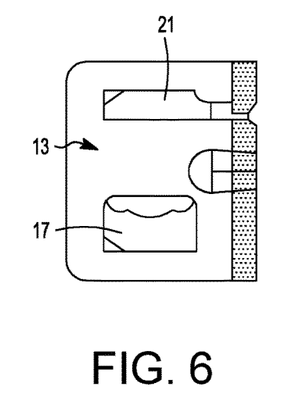
FIG. 6 is an end view of the bracket of FIG. 3.
Figure 7:
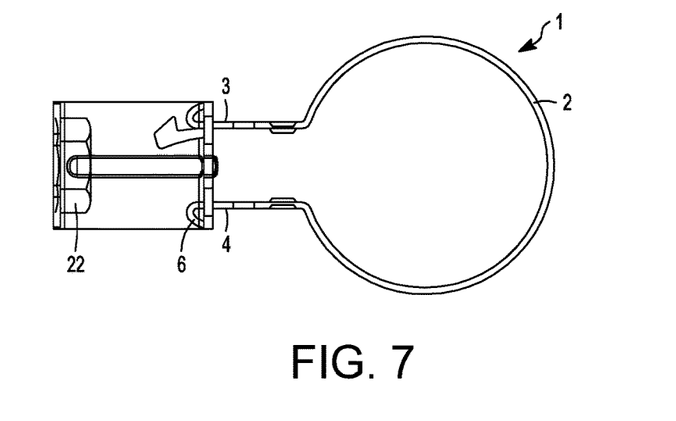
FIGS. 7 to 10 show plan, side, top end and perspective views respectively of another embodiment of a bracket similar to the bracket of FIGS. 3 to 6, in co-operation with a clip of FIGS. 1 and 2.
Figure 8:
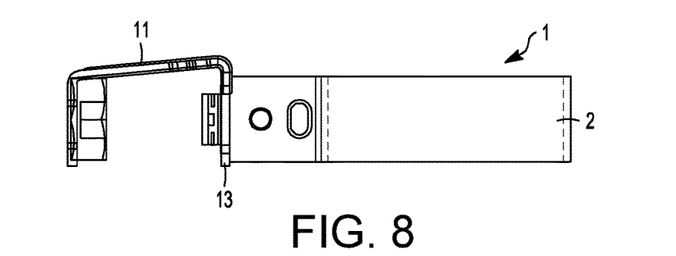
Figure 9:
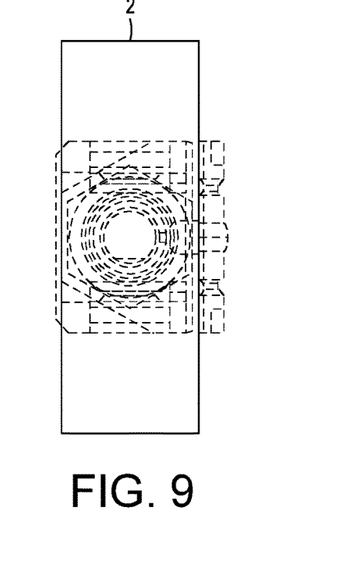
Figure 10:
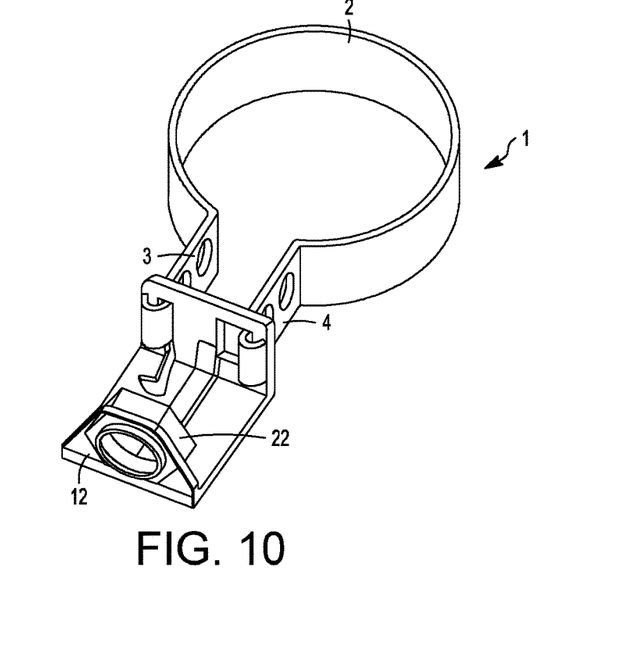
Figure 11:
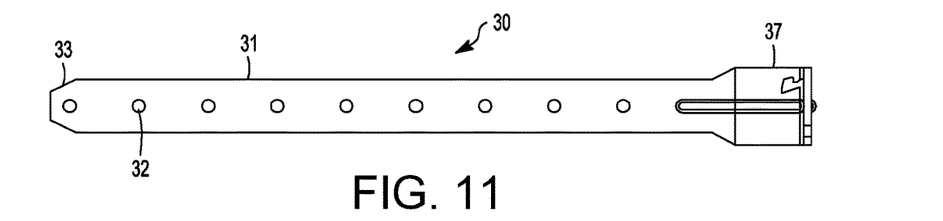
FIG. 11 is a top plan view of a further embodiment of a bracket in accordance with the present invention.
Figure 12:
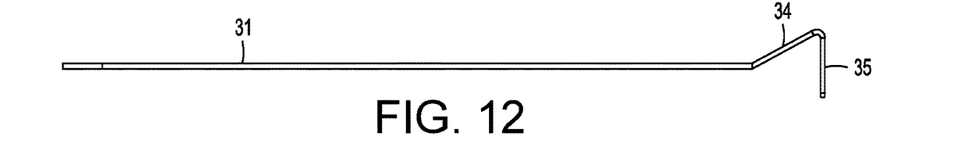
FIGS. 12, 13 and 14 are side, end and top perspective views respectively of the bracket of FIG. 11.
Figures 13, 14:
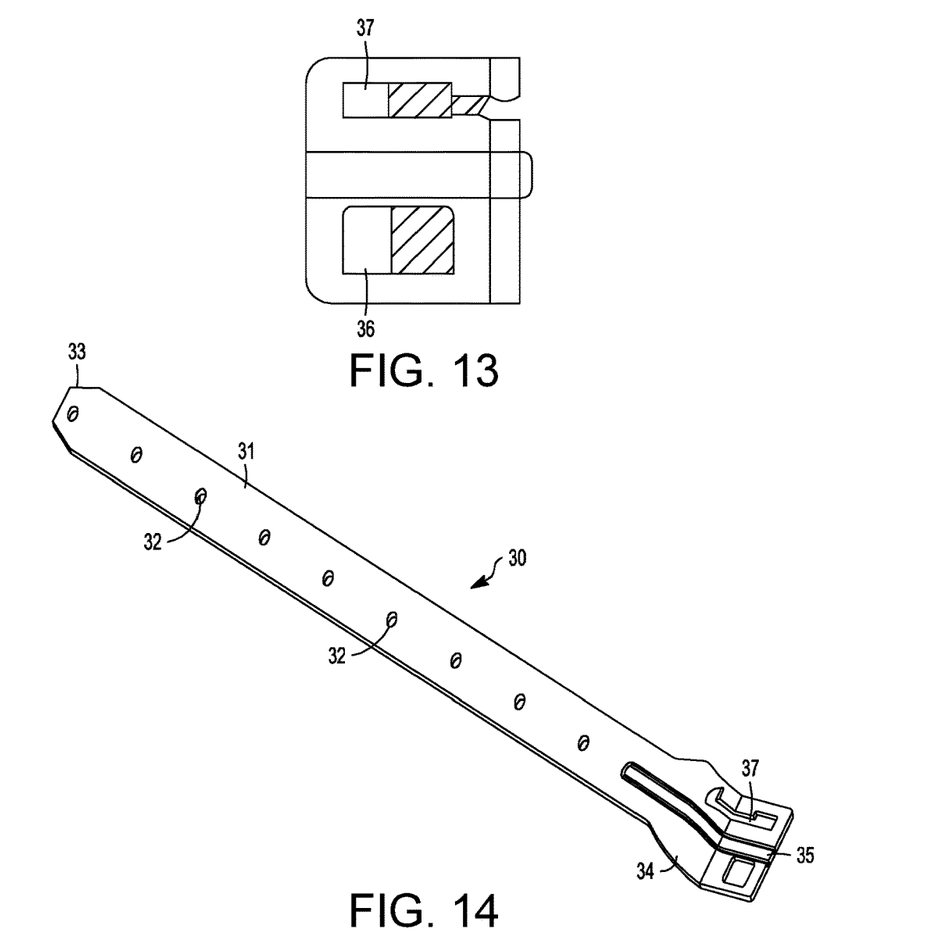
Figure 15:
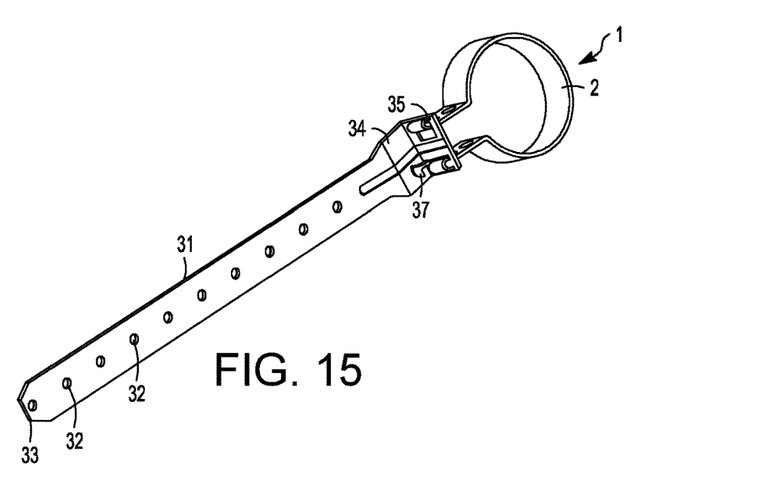
FIGS. 15 to 18 are perspective, side top and top plan views respectively of the bracket of FIG. 11 in co-operation with a clip member of FIGS. 1 and 2.
Figure 16:
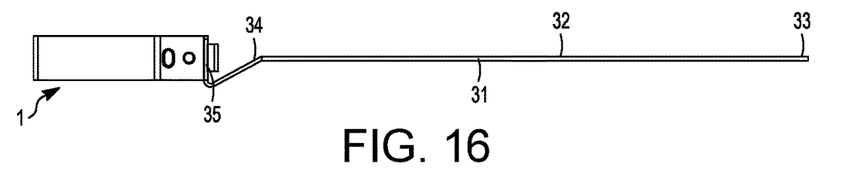
Figure 17:
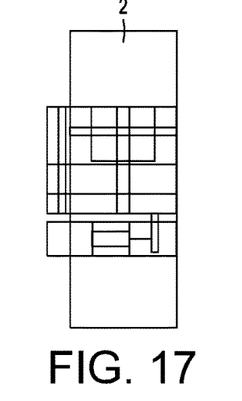
Figure 18:
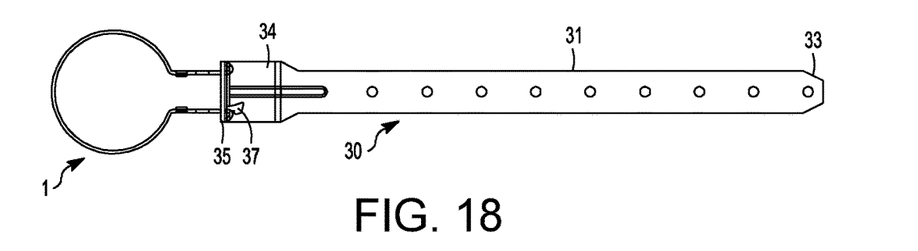
Figure 19:
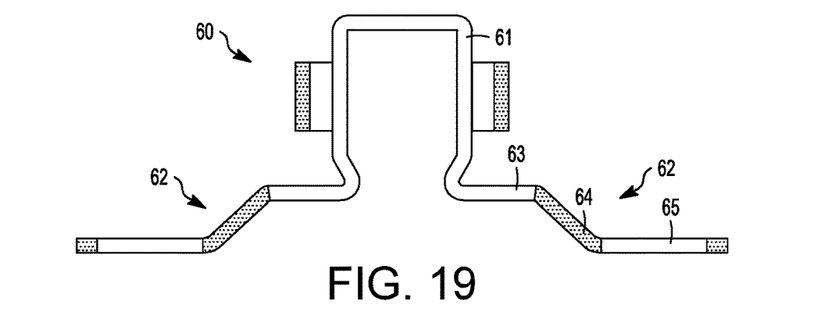
FIG. 19 is a side elevational view of another preferred embodiment of a bracket in accordance with the invention.
Figure 20:
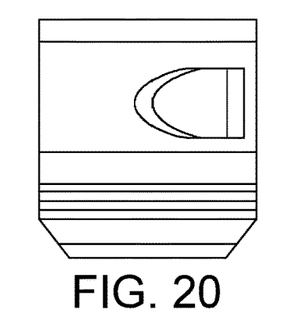
FIGS. 20, 21 and 22 are side, top plain and top perspective views respectively of the bracket of FIG. 19.
Figure 21:
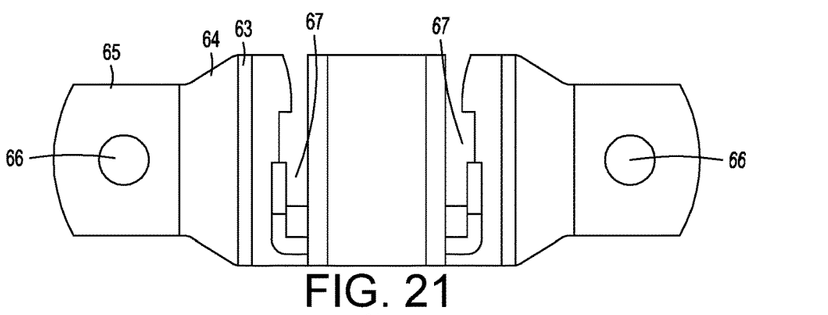
Figure 22:
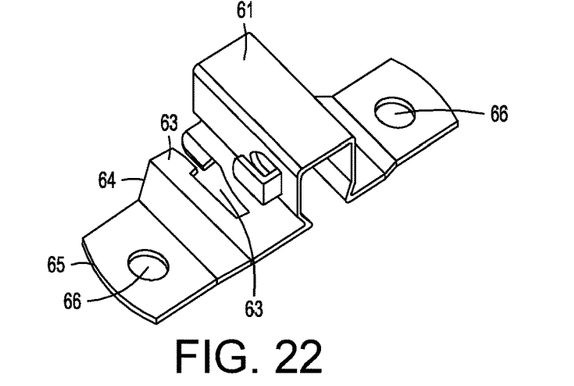
Figure 23:
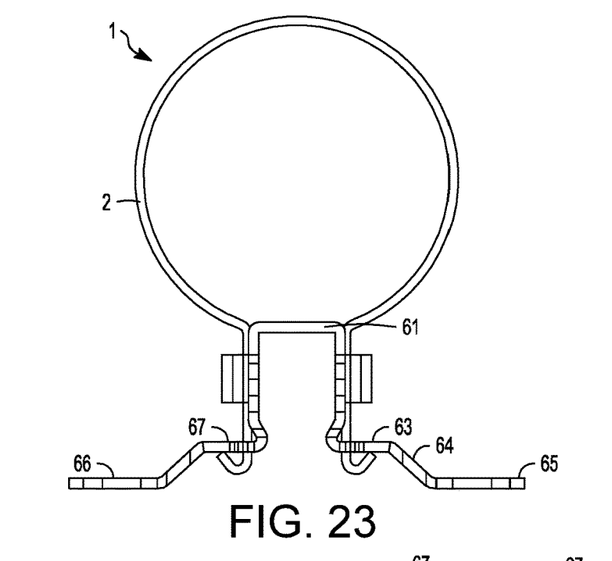
FIGS. 23, 24, 25 and 26 are side elevation, end, top and top perspective views respectively of the bracket of FIGS. 19 to 22 in working co-operation with a clip member of FIGS. 1 and 2.
Figure 24:
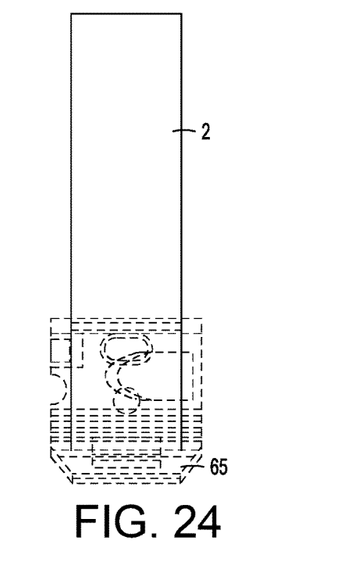
Figure 25:
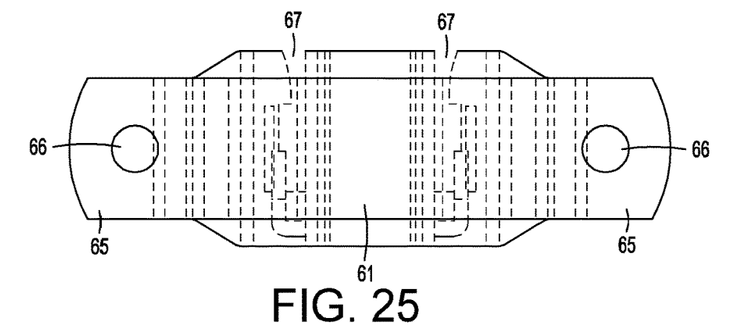
Figure 26:
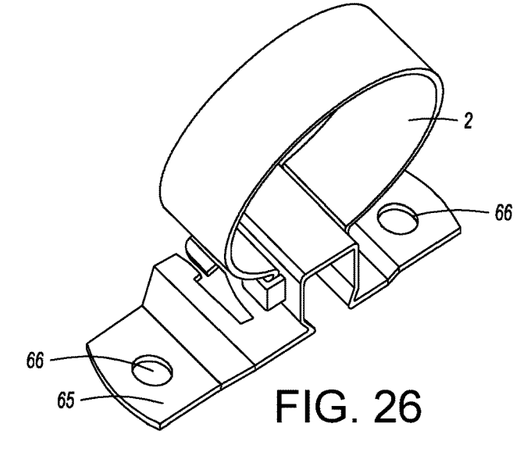
Figure 27:
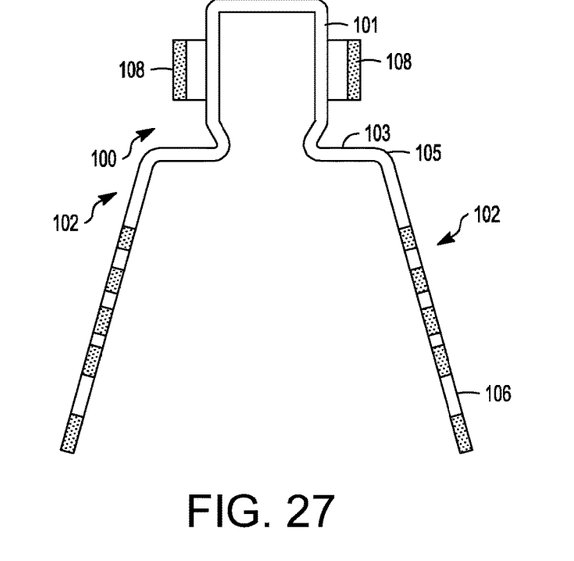
FIG. 27 is side view of a yet further embodiment of a bracket in accordance with the invention.
Figure 28:
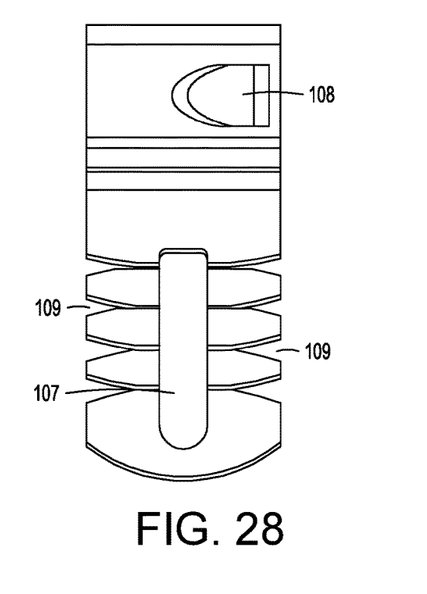
FIGS. 28 to 31 are edge, side, top and top perspective views respectively of the bracket of FIG. 27.
Figure 29:
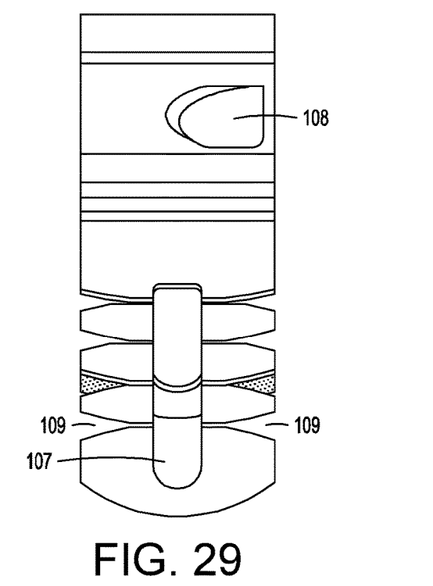
Figure 30:
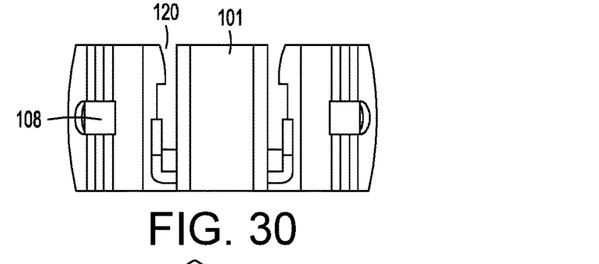
Figure 31:
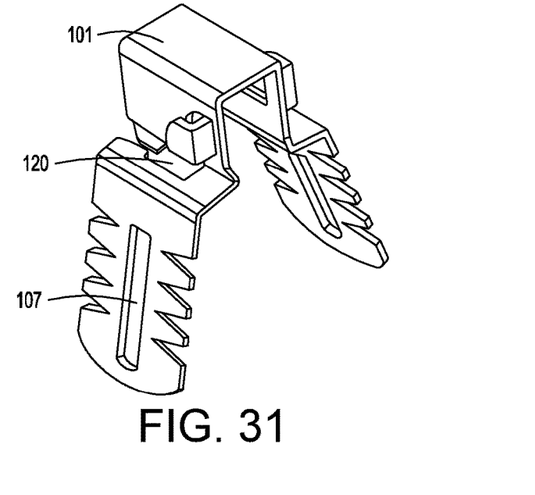
Figure 32:
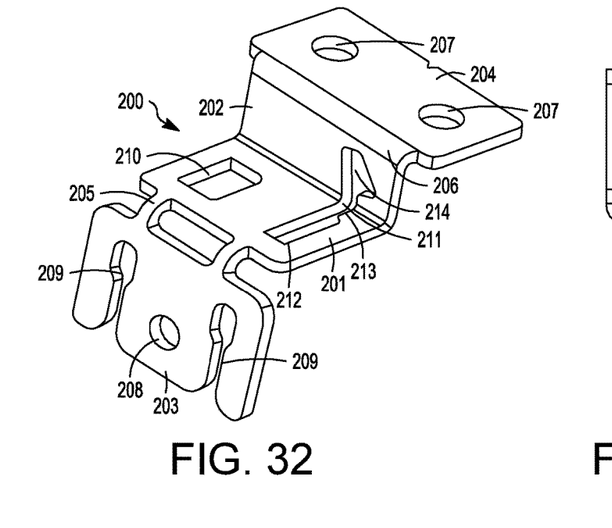
FIG. 32 is a perspective view of yet a further embodiment of a bracket in accordance with the invention.
Figure 33:
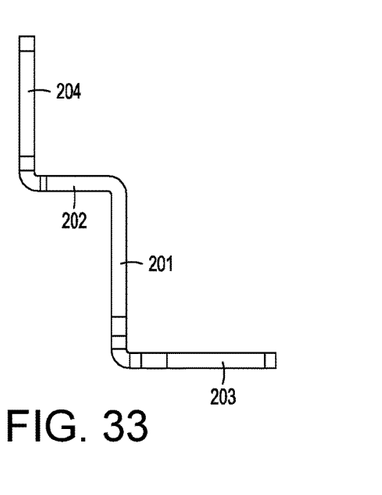
FIG. 33 is an edge or side view of the bracket of FIG. 32.
Figure 34:
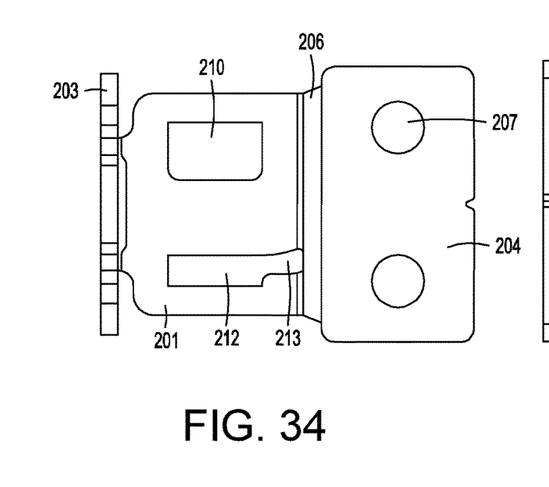
FIG. 34 is a top view of the bracket of FIG. 32.
Figure 35:
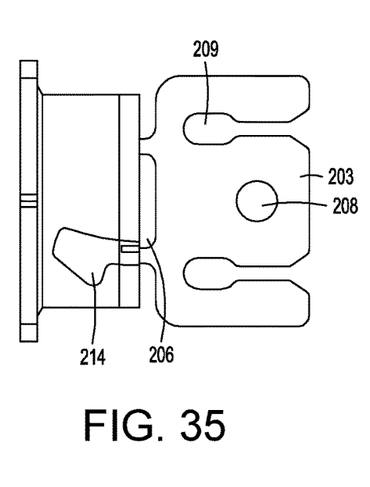
FIG. 35 is an end view of the bracket of FIG. 32.
Figure 36:
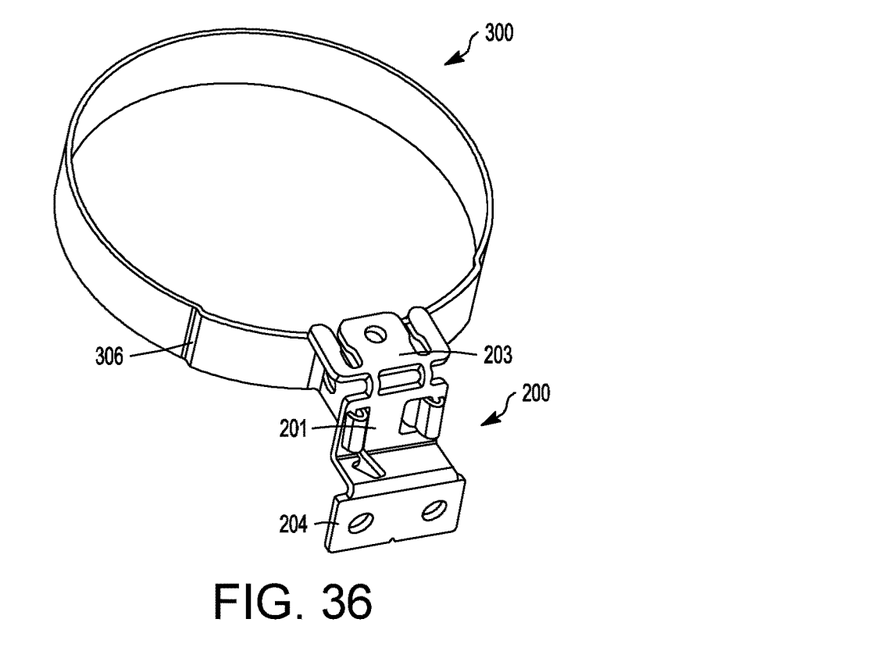
FIG. 36 is a perspective view of the bracket of FIGS. 32 to 35 in co-operation with a clip member of FIGS. 1 and 21, when in the process of being installed.
Figure 37:
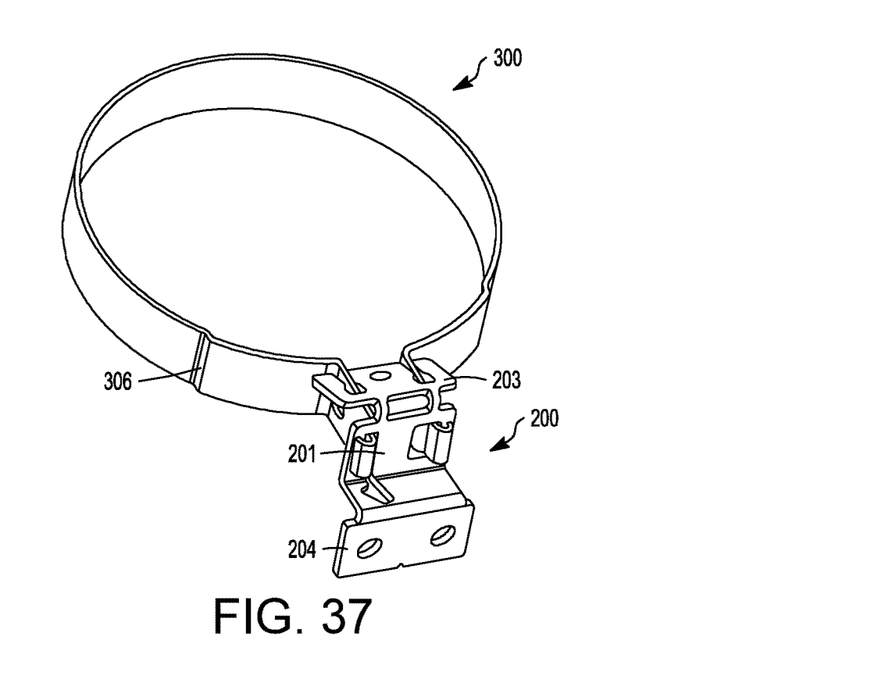
FIG. 37 is a view, similar to FIG. 36 of the bracket of FIGS. 32 to 35 when actually installed on a clip member as shown in FIGS. 1 and 2.
Figure 38:
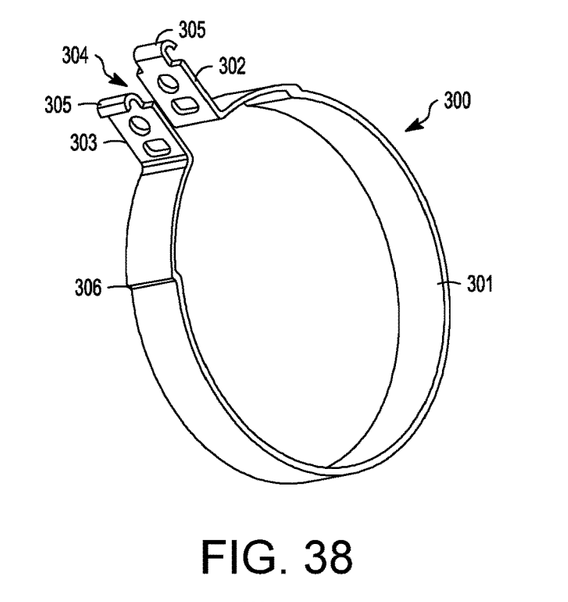
FIG. 38 is a perspective view of an alternative embodiment of a clip member for use with a bracket in accordance with the present invention.
Figure 39:
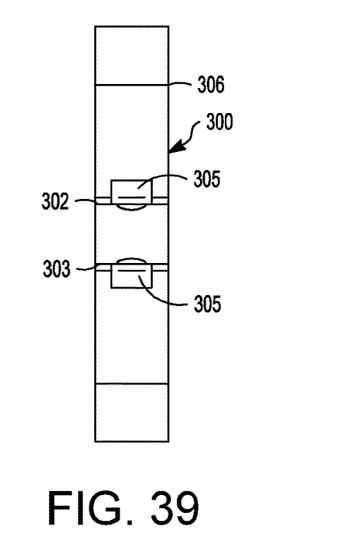
FIG. 39 is a top view of the clip member of FIG. 38.
Figure 40:
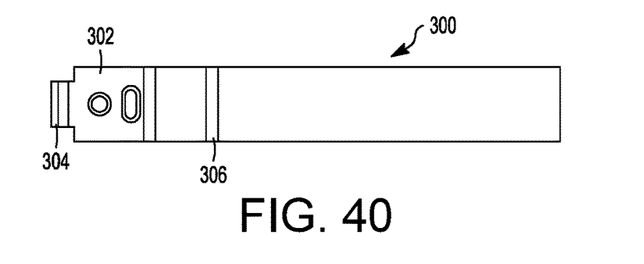
FIG. 40 is a side view of the clip member of FIG. 38.
Figure 41:
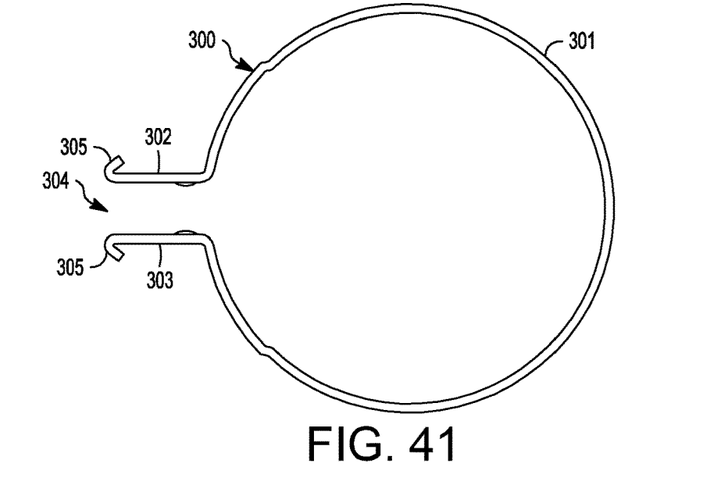
FIG. 41 is an edge view of the clip member of FIG. 38.

FIGS. 1 and 2 show a preferred embodiment of a clip member, generally designated 1, to be used for attaching/fixing piping, tubing or ducting to or in the vicinity of a wall, ceiling or other support surface of a building or the like structure. The clip member 1 includes a substantially annular clip body 2 which can be made of any suitable material, as for example a metal or a plastics material. The clip member 1 further includes opposed clip body ends 3 and 4 which extend substantially normally to the free ends of the annular clip body 2, the clip body ends 3 and 4 providing therebetween a passage 5. In use the clip body ends 3 and 4 may be separated to the extent needed to allow for passing of piping, tubing or ducting, via the passage 5, into the clip body 2, the ends 3 and 4 then being returned to the position shown in the drawings to engage the piping, tubing or ducting.

At the free edge or end of each clip body end 3, 4 there is provided a shaped flange 6, for a purpose to be described in more detail later in this specification. In the especially preferred embodiment shown the flanges 6 extend or depend from the clip body ends 3, 4 at an angle other than 90°. The clip member 1 preferably is a unitary member which may be formed in any suitable manner and using any suitable means, as for example stamping or pressing.

With regard now to FIGS. 3 to 6, the bracket shown therein is a variant of a bracket of this general type which is intended, in use, to co-operate with a clip member, of the type shown in FIGS. 1 and 2. This bracket 10, of a unitary construction, includes as principal components a central section 11 and, depending substantially normally from each end thereof, opposed flanges or end extensions 12 and 13, such being connected to the central section 11 by web or joining sections 14 and 15 respectively. In the preferred embodiment shown the flange 12 is of a substantially tetrahedral shape and has at least one aperture 16 which is disposed substantially centrally thereof. The second flange or extension 13, in the preferred embodiment shown, is of a substantially parallelepipedal shape and has at least one aperture 17 formed therein and extending therethrough, such aperture 17 preferably also being substantially parallelepipedal or rectangular in cross-section.

The bracket 10 further includes, extending longitudinally of the central section 11, flange 13 and web section 15, a shaped slot 18. In the preferred embodiment shown the slot 18 includes sections along its length which exhibit three different cross-sections, namely an end section 19 of enhanced width, which in the preferred embodiment is located in flange 13, a second intermediate section 20 of reduced width, which in the preferred embodiment shown extends across part of the length of flange 13, across the entire length of web section 15, and along at least part of the length of central section 11, and a third section 21 which, in the preferred embodiment shown, has a trapezoidal section or profile.

The principle of operation of this bracket 10 is that, in use, a bracket 10 will be appropriately disposed relative to a surface (wall, ceiling or the like) and removably affixed thereto in any suitable manner and using any suitable means, as for example a threaded member of any known type, as for example a screw or bolt, which is adapted to be disposed through the aperture 16 of first flange or extension 12. In an especially preferred embodiment, as shown for example in FIGS. 7 to 10, a nut or the like threaded member 22 may be associated with the inner surface of the flange or extension 12, as for example by welding. In use a screw, bolt or the like member can be disposed through such a nut 22, to extend into the wall, ceiling or the like surface, whereby to affix the bracket 10 in place relative thereto.

The practice is that a number of such brackets 10 may be disposed at spaced-apart locations across the length of the wall, ceiling or other surface to which the piping, tubing or ducting is to be attached. The installer then locates, with each bracket 10, a clip member of the type shown in FIGS. 1 and 2, with the flanges 6 of such clip member initially being passed through the shaped third section 21 of the slot 18. Once thus inserted into or co-operating with the bracket 10, the clip member will not readily separate from or be released thereby. The installer can then locate or dispose the piping, tubing or ducting within the clip member at each bracket 10 and, when satisfied that such is in the correct location, can then either manually or using a suitable tool bring the other end of each clip member, into co-operation with its associated bracket 10, with that other end being disposed releasably within the aperture 17 of flange 13.

FIGS. 11 to 18 show a further preferred embodiment or variant of a bracket, generally designated 30. Bracket 30 includes a shank or arm member 31 which, in the preferred embodiment illustrated, includes a plurality of apertures 32 at spaced-apart positions along the length thereof. It should be understood that the length of the arm member 31, and the number of apertures 32 appearing therein, are not of the essence of the invention and the length of the arm member 31 can vary, from bracket to bracket, dependent upon the desired spacing for the piping, tubing or ducting from the wall, ceiling, roof or the like surface. In use the shank 31 is adapted to be disposed, to a given depth, within for example courses of mortar or the like of, for example, a brick wall or the like, with the free end 33 of shank 31 being disposed inwardly of the wall. Extending or depending at an angle from the shank 31 is an intermediate section 34, and substantially normal to the plane of the shank 31 and depending from the intermediate section 34 is an end section 35. The end section 35, in like manner to bracket 10, including at least one aperture 36.

As shown the bracket 30, in like manner to bracket 10 of FIGS. 3 to 10, includes a shaped slot 37 which extends across at least part of the length dimension of both the intermediate section 34 and end section 35, such slot 37 being of a similar configuration to the slot 18 of bracket 10.

Turning then to FIGS. 19 to 26, the bracket 60 shown therein is a further preferred embodiment of a bracket in accordance with the invention which, in use, co-operates with a clip member 1 of FIGS. 1 and 2 in order to releasably affix piping, tubing or ducting (not shown) in place relative to a wall, ceiling or other surface (not shown) of a building or the like structure. The bracket 60 is adapted, in use, to be fixedly yet removably located relative to the wall, ceiling or the like surface. The bracket 60 includes a substantially U-shaped member 61 having an extension member 62 depending from each end thereof and at an angle to the plane of the U-shaped member 61. The extension members 62, in the preferred embodiment shown, are each made up of a first section 63, extending substantially normally to the U-shaped member 61, an intermediate section 64 depending downwardly at an angle to the first section 63, and an end section 65 including at least one aperture or slot 66 therein.

The substantially U-shaped member 61 of the bracket 60 includes, on each leg thereof, at least two spaced-apart L-shaped protrusions, formed therein in any suitable manner and using any suitable means, as for example in a punching operation.

The bracket 60, in like manner to the earlier described brackets 10 and 30, includes a shaped slot 67 extending across at least part of the lateral dimension of each extension number 62. Such a slot 67 is of a similar profile to the slots of the earlier-described brackets, and serves the same purpose, namely to minimize the possibility of unwanted separation of clip member from bracket during the procedure of installation of piping, tubing or ducting.

Turning then to FIGS. 27 to 31, the bracket 100 shown therein is a further preferred embodiment of a bracket in accordance with the invention which, in use, co-operates with the clip member 1 of FIGS. 1 and 2 in order to releasably affix piping, tubing or ducting in place relative to a wall, ceiling or other surface (not shown) of a building or the like structure. The bracket 100 is adapted, in use, to be fixedly yet removably located relative to a wall, ceiling or the like surface.

The bracket 100 includes a substantially U-shaped member 101 having an extension member 102 depending from each end thereof and at an angle to the plane of the substantially U-shaped member 101. The extension members 102, in the preferred embodiment shown, are each made up of a first section 103, extending substantially normally to the U-shaped member 101, an intermediate section 105 depending downwardly at an angle to the first section 103, and an end section 106 including at least one longitudinally extending aperture or slot 107 therein for receiving and releasably retaining a fixing means, as for example a screw, bolt, rivet or the like, to allow the overall bracket 100 to be releasably affixed in place relative to the wall, ceiling or the like surface. The U-shaped member 101 of the bracket 100 includes, on each leg thereof, at least two, spaced-apart L-shaped protrusions 108, formed therein in any suitable manner and using any suitable means, as for example in a punching operation.

Each extension member 102 preferably includes opposed pairs of laterally extending grooves 109 formed therein and extending across at least a minor part of the lateral dimension thereof. The pairs of grooves 109 are disposed at spaced-apart intervals along at least part of the longitudinal dimension of each extension member 102. Preferably the grooves 109 will be of a substantially triangular or wedge-shape as shown in the drawings.

The bracket 100, in like manner to bracket 60 described earlier, includes a shaped slot 120 extending across at least part of the width dimension of each extension member 103. Such a slot 120 is of a similar profile to the slots of the earlier-described brackets, and is intended to serve the same purpose.

In use, a bracket 100 in accordance with the present invention will be firstly fixed to a wall, ceiling or the like surface, using any suitable means and in any suitable manner. The installer then need only manually apply pressure inwardly to the clip body 2, which results in movement of the clip body ends 3 and 4 in a direction towards one another, to allow the clip body ends 3, 4, with flange 6, to pass into and through the protrusions 108 of the bracket 100, with movement of clip body ends continuing until such time as they pass through the apertures/slots 104. Relaxation of pressure on the clip body 2 then allows the clip body ends 3 and 4 to return to their "normal" position, wherein the flanges 6 come into contact/engagement with the undersurface of bracket 100 to retain the clip member 1, and any piping, tubing or ducting associated therewith, relative to the bracket 100 and as a consequence, the wall, ceiling or the like surface to which the bracket 100 is fixed.

Turning then to the embodiment of FIGS. 32 to 35, the bracket 200 shown therein is of a unitary construction and includes, as principal components a central section 201 which has, depending or extending substantially normally from one end thereof, a section 202. The bracket 200 further includes, depending or extending substantially normally from the other end of central section 201 and section 202, flanges or extensions 203 and 204 respectively, the flanges or extensions 202 and 203 being connected to the sections 202 and 201 respectively by webs or the like 205 and 206. In the preferred embodiment shown the flanges or extensions 203 and 204 are each of a substantially parallelepipedal shape. Flange or extension 204 includes at least one, and preferably two, apertures 207 extending therethrough. Flange 203 includes at least one aperture 208 disposed substantially centrally thereof and extending therethrough, further preferably including two spaced-apart and shaped slots 209 as shown.

The central section 201 includes at least one aperture 210 formed therein and extending therethrough, said aperture 210 preferably being substantially parallelepipedal or rectangular in cross-section.

This bracket 200 further includes, extending longitudinally of the central section 201, and extending into the adjoining section 202, a shaped slot 211. In the especially preferred embodiment shown that slot 211 includes portions/sections along its length which exhibit different cross-sections, namely an end portion 212 of enhanced width, which in the preferred embodiment shown is located in central section 201, a second or intermediate section or portion 213 of reduced width, which preferably extends across part of central section 201 and into section 202, and a third section/portion 214 which, in the preferred embodiment shown, has a trapezoidal section or profile.

FIGS. 38 to 41 inclusive show a clip member, generally designated 300, to be used in combination with a bracket in accordance with the present invention for attaching/fixing piping, tubing or ducting or the like to or in the vicinity of a wall, ceiling or other support surface of a building or the like structure. The clip member 300 includes a substantially annular clip body 301 which can be made of any suitable material, as for example a metal or a plastics material. In the preferred embodiment illustrated the clip member 300 is intended to be used with, and to support, piping, tubing, ducting or the like which is substantially round/circular. As such, the clip body 301 is of a substantially circular shape as shown in FIGS. 38 to 41.

The clip member 300 further includes opposed clip body ends 302 and 303 which extend substantially normally to the free ends of the annular clip body 301, the clip body ends 302 and 303 providing therebetween a passage 304. In use the clip body ends 302 and 303 may be separated to the extent needed to allow for passing of piping, tubing, or the like via the passage 304, into the clip body 301, the ends 302 and 303 then being returned to the position shown in the drawings to engage the piping, tubing, ducting or the like.

At the free edge or end of each clip body end 302, 303 there is provided a shaped flange 305. The clip member 300 is a unitary member which may be formed in any suitable manner and using any suitable means, as for example by stamping or pressing. Preferably the clip member 300 is constructed from a metallic material, using any suitable method and means. It should be understood, however, that the material of construction does not constitute part of the invention. Indeed in an alternative the clip body 301 may be constructed of a plastics material.

Whilst known clip members of this general type exhibit constant rigidity around the circumference or periphery thereof, in accordance with the present invention the clip member 300 includes, at or in the vicinity of each end 302, 303 thereof, a section of a different rigidity when compared with the remainder of the clip member 300 itself. In the preferred embodiment illustrated this is achieved by forming the clip member 300, in any known manner, with a discontinuity—as for example a shoulder or the like 306 in the vicinity of each end 302, 303 but spaced therefrom. In use the existence of such discontinuity 306 has been found to give rise to a reduction in the pressure/load needed to be applied to the ends 302, 303 of the clip member 300 to bring them together to a sufficient extent as to allow for ready installation or removal of the ducting, piping, tubing or the like, without needing any ancillary tooling. Indeed the average person will be able to apply sufficient finger-pressure to achieve the desired result.

The central section 201 includes at least one aperture 210 formed therein and extending therethrough, said aperture 210 preferably being substantially parallelepipedal or rectangular in cross-section.

This bracket 200 further includes, extending longitudinally of the central Section 201, and extending into the adjoining section 202, a shaped slot 211. In the especially preferred embodiment shown that slot 211 includes portions/sections along its length which exhibit different cross-sections, namely an end portion 212 of enhanced width, which in the preferred embodiment shown is located in central section 201, a second or intermediate section or portion 213 of reduced width, which preferably extends across part of central section 201 and into section 20e, and a third section/portion 214 which, in the preferred embodiment shown, has a trapezoidal section or profile.

Brackets of the type shown in the drawings, when compared with the known art, afford to the installer a degree of flexibility not possible with the prior art. In that regard, and dependent on the smoothness or evenness of the surface with which the piping, tubing, ducting or the like is to be associated, a bracket in accordance with the present invention can be readily adapted to suit differing requirements. Dependent upon how far (in distance) the piping, tubing, ducting or the like is to be displaced from the surface, then the effective length of each extension member of a bracket 100 of the type shown in, for example FIGS. 27 to 31 of the drawings can be varied by bending the or each extension member 102 about the line of weakening provided by the grooves 109 formed therein.

The combination of clip member and bracket member in accordance with the invention, and as described earlier, is simple to install, even by a non-skilled worker. This is especially advantageous when piping, tubing, ducting or the like is required to be located/affixed within confined, hard-to-access locations.

Finally, it is to be understood that the aforegoing description refers merely to preferred embodiments of the invention, and that variations and modifications will be possible thereto without departing form the spirit and scope of the invention, the ambit of which is to be determined from the following claims.

What is claimed is:

1. A bracket which is adapted, in use, to be releasably co-operable with a pipe clip, said bracket including:
a first substantially planar member/section, having a first extension member/section extending substantially normally to one end thereof, connected to said one end by one or more web sections, a second extension member/section extending substantially normally to the other end of said planar member/section, and a third extension member/section extending substantially normally to said second extension member/section and connected to said second extension member/section by a web section, and including a shaped slot which extends across at least part of both said planar member/section and said second extension member/section, wherein said shaped slot includes, along its length, three adjacent portions or sections of a different cross-section, a first portion or section of enhanced width in said planar member/section, a second portion or section of reduced width extending across at least part of both said planar member/section and said second extension member/section, and a third portion or section of a trapezoidal section, extending across at least part of said second extension member/section.

2. The bracket as claimed in claim 1, constructed from metal.

* * * * *